(12) United States Patent
Wang et al.

(10) Patent No.: US 10,469,573 B2
(45) Date of Patent: Nov. 5, 2019

(54) METHOD, APPARATUS, AND SYSTEM FOR MANAGING INVITATIONS FOR MULTI-DEVICE PARTICIPATION IN AN APPLICATION PROGRAM

(71) Applicant: Alibaba Group Holding Limited, George Town (KY)

(72) Inventors: Yong Wang, Hangzhou (CN); Ke Xu, Hangzhou (CN)

(73) Assignee: Alibaba Group Holding Limited (KY)

( * ) Notice: Subject to any disclaimer, the term of this patent is extended or adjusted under 35 U.S.C. 154(b) by 168 days.

(21) Appl. No.: 14/702,218

(22) Filed: May 1, 2015

(65) Prior Publication Data

US 2015/0326663 A1   Nov. 12, 2015

(30) Foreign Application Priority Data

May 7, 2014   (CN) .......................... 2014 1 0189849

(51) Int. Cl.
*G06F 15/16* (2006.01)
*H04L 29/08* (2006.01)
*H04L 29/06* (2006.01)
*G06F 16/951* (2019.01)
*G07F 17/32* (2006.01)

(52) U.S. Cl.
CPC ........ *H04L 67/1095* (2013.01); *G06F 16/951* (2019.01); *G07F 17/3225* (2013.01); *G07F 17/3283* (2013.01); *H04L 65/403* (2013.01)

(58) Field of Classification Search
CPC ..................... G07F 17/3225; G07F 17/3283
See application file for complete search history.

(56) References Cited

U.S. PATENT DOCUMENTS

| | | | |
|---|---|---|---|
| 7,311,608 B1 | 12/2007 | Danieli et al. | |
| 7,593,988 B2 | 9/2009 | Oreizy et al. | |
| 8,621,585 B2 | 12/2013 | Danieli et al. | |
| 9,578,602 B1 * | 2/2017 | Acharya | H04W 52/0258 |
| 2006/0178216 A1 | 8/2006 | Shea et al. | |
| 2007/0081647 A1 * | 4/2007 | Baker | H04M 3/4288 379/158 |
| 2010/0124321 A1 * | 5/2010 | Alexandrov | H04L 65/403 379/202.01 |
| 2010/0178986 A1 | 7/2010 | Davis et al. | |
| 2010/0319062 A1 * | 12/2010 | Danieli | H04L 12/1818 726/7 |
| 2012/0162538 A1 * | 6/2012 | Dixon | H04L 12/2814 348/734 |

* cited by examiner

*Primary Examiner* — Padma Mundur
(74) *Attorney, Agent, or Firm* — Van Pelt, Yi & James LLP

(57) ABSTRACT

Embodiments of the present application relate to a method and system for managing invitations to participate in an application program. The method includes acquiring, at an application service device, application program information associated with an application program executed by the application service device, determining, based at least in part on the application program information, whether the application program supports participation by another application service device, and in the event that the application program supports participation by another application service device, sending invitation information associated with the application program to a client device that is connected to the application service device.

24 Claims, 8 Drawing Sheets

METHOD, APPARATUS, AND SYSTEM FOR MANAGING INVITATIONS FOR MULTI-DEVICE PARTICIPATION IN AN APPLICATION PROGRAM

CROSS REFERENCE TO OTHER APPLICATIONS

This application claims priority to People's Republic of China Patent Application No. 201410189849.8 entitled A METHOD, A DEVICE, AND A SYSTEM FOR PARTICIPATING IN AND RESPONDING TO APPLICATION PROGRAMS, filed May 7, 2014 which is incorporated herein by reference for all purposes.

FIELD OF THE INVENTION

The present application relates to a method for managing invitations. In particular, the present application relates to a method, an apparatus, and a system for inviting participation in application programs and receiving responses to invitations.

BACKGROUND OF THE INVENTION

The continual development of smart mobile technology has given rise to the rapid development of types and functions of smart devices. Different smart devices are continually being designed and accepted by a vast number of users. In addition to being able to complete basic operations such as communicating, reading, and image capturing using various smart devices, users can jointly participate in games, participate in image-sharing and commenting, and other such operations by exchanging information between different devices.

It is becoming increasingly common for users to participate jointly in application programs through different device terminals (including smart terminals and non-smart terminals). For example, a household environment can include two PCs, several smart phones, one tablet computer, one smart television, and two gamepads. The smart devices included in the household environment may be connected to the same network group (e.g., a home Local Area Network (LAN)). Different users (e.g., each member of the family) can play a game through a different terminal by participating in the same application (app).

Existing techniques for inviting users to participate in the app have various deficiencies. For example, each application program with a function for multi-person participation typically has its own, single invitation method and invitation menu. Such a design is not very extensible and thus, an invitation method is not uniform across different application programs. Accordingly, learning the invitation methods and menus for a large number of application programs is difficult. As another example, the typical invitation method is manual and requires numerous inputs from various users that are to participate in the multi-person participation function of an application. Further, the steps associated with the respective manual invitation method for each application program may vary, which can create confusion for the users.

BRIEF DESCRIPTION OF THE DRAWINGS

Various embodiments of the invention are disclosed in the following detailed description and the accompanying drawings.

DETAILED DESCRIPTION

Figure 1:
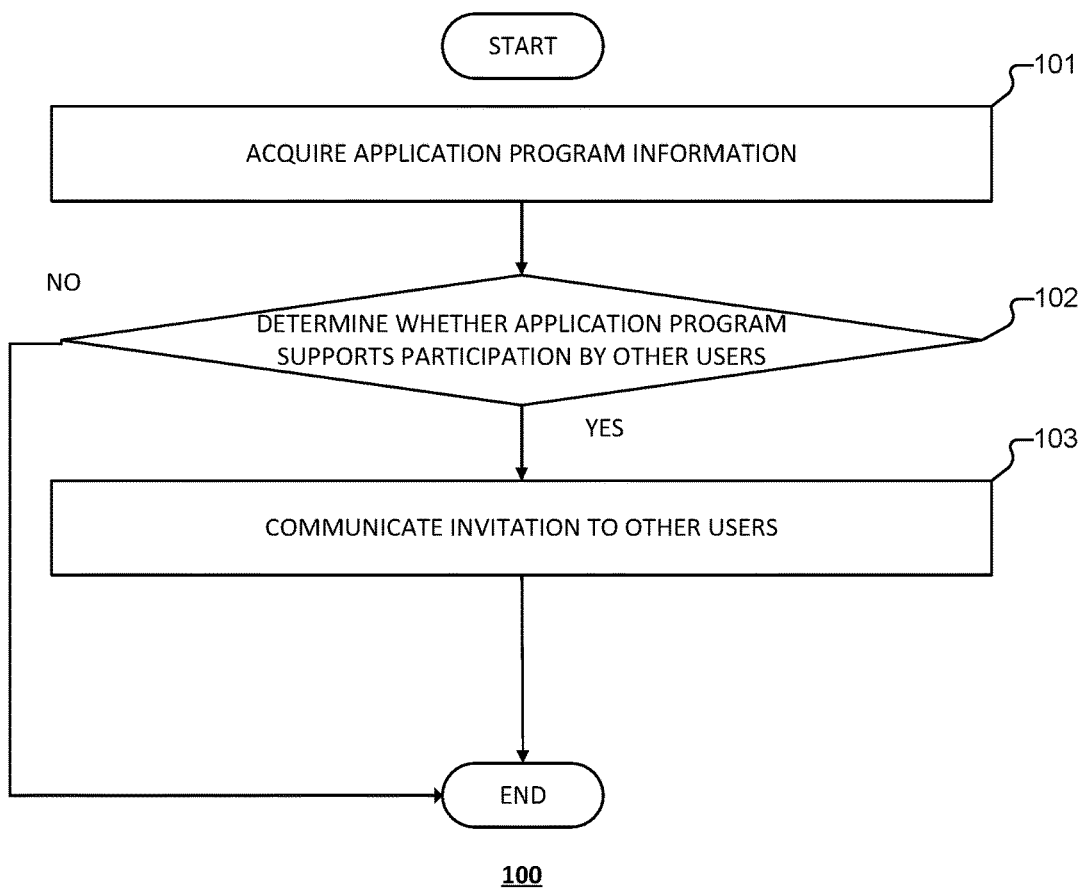
FIG. 1 is a flowchart of a method for inviting participation in application programs according to various embodiments of the present disclosure of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The description below expounds many concrete details in order that the present application may be fully understood. However, the present application can be implemented in many ways other than those described here. A person skilled in the art may extend the present application similarly without violating the meaning of the present application.

Therefore, the present application is not limited by the specific embodiments disclosed below.

Various embodiments of the present disclosure include a method, an apparatus, and a system for inviting participation in application programs, and a method, apparatus, and a system for responding to invitations.

In a typical multi-player game, an invitation process is required to be performed in order for joint participation in a game. For example, a user who first logs into the game, or otherwise first establishes a group game, is required to invite other users in order for the other users to be able to participate in the game. The other users can accept the invitation and log into the same game and jointly participate.

In some cases, inviting users includes executing an application that allows participation by other users, searching for other users across the same network group, selecting a device permitted to participate in the application, receiving an acceptance of an invitation to participate in the application from the selected device, installing or activating a control service associated with the application, and starting the application or joint participation in the application.

A user can select an application that permits operations by many people (e.g., a game). The user activates the app through a smart television set-top box or the like. After activating the app, the user assesses whether the app permits operation by many people.

The user can select a menu option corresponding to "Multi-player game" among the app menu options. The user can search for other users within the same network group. As an example, the user can search for other users that have an activated communication function that allows the devices of the other users to communicate with the device of the user. For example, the other users who are preparing to participate in the app (e.g., the game) are required to activate an associated connecting function, such as WiFi or Bluetooth, of the respective smart device and wait to be searched by the device of the user.

Upon being found, the other users can access the equipment and have their identifications appearing on the corresponding interface. Thereupon, the user who is already logged into the game (e.g., the user that initially executed the app) can select the smart devices that are to be permitted to participate in the app (e.g., game).

The users who are permitted to participate in the app (e.g., game) can receive an invitation from the device of the user that initially executed the app (and started the multi-party participation function). The users who are permitted to participate in the app can communicate an acceptance of the invitation on the user's respective smart devices.

The smart devices activate a control service associated with (e.g., used by) the app (e.g., game). As an example, the smart devices, after getting permission, can install and activate a control service associated with (e.g., used by) the game.

The users of the smart devices can start the game.

A device generally refers to a device used (e.g., by a user) within a network system and used to communicate with one or more servers. According to various embodiments of the present disclosure, a terminal may include communication functionality. For example, a device may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), or the like.

According to some embodiments of the present disclosure, a device includes a smart home appliance with communication functionality. A smart home appliance can be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, or the like.

According to various embodiments of the present disclosure, a device can be any combination of the foregoing devices. In addition, it will be apparent to one having ordinary skill in the art that a device according to various embodiments of the present disclosure is not limited to the foregoing devices.

According to various embodiments, a smart device is a device that is connected to other devices or networks via different communication protocols (e.g., wireless protocols) such as Bluetooth, Near Field Communications (NFC), WiFi, 3G, 4G, the like, or any combination thereof. In some embodiments, a smart device can operate interactively or autonomously. In some embodiments, a smart device has ubiquitous computing properties. In some embodiments, a smart device has dynamic component-oriented resource extensions & plug-ins (Plug and play) of some hardware resources. In some embodiments, a smart device has remote external service access and execution. In some embodiments, a smart device has local, internal autonomous service execution. In some embodiments, a smart device has access to human interaction, physical world interaction, and distributed Information and Communications Technology (ICT)/virtual computing interaction. A smart device can run an operating system such as iOS, Android, Windows, Windows Phone, or the like.

FIG. 1 is a flowchart of a method for inviting participation in application programs according to various embodiments of the present disclosure of the present application.

Referring to FIG. 1, a method 100 for inviting participation in an application program is provided. In some embodiments, the method 100 is implemented by device 200 of FIG. 2. In some embodiments, the method 100 is implemented by system 700 of FIG. 7.

At 101, application program information is acquired. In some embodiments, the application information is associated with an application program that is running on an application service device. The application information can be acquired by a processor of the application service device.

In some embodiments, an application service device corresponds to a smart device or smart terminals that are configured to execute the application. The application service device can implement a method relating to multi-user participation in an application (e.g., an application program). As an example, the application service device can implement a method for inviting participation in an application. As another example, the application service device can implement a method for responding to an invitation to participate in an application. The method for relating to multi-user participation (e.g., the method for inviting participation or the method for responding to an invitation) can be executed in middleware of the corresponding application service device or in a submodule of the corresponding application service device.

According to various embodiments of the present disclosure, the application service device can run any mobile smart operating system or desktop operating system that can install and run an application program. As an example, mobile operating systems include Android, IOS, WP (Windows Phone), or the like. As an example, desktop operating systems include Windows, Linux, Mac OSX, or the like.

In some embodiments, middleware on the application service device or a sub-module integrated with the application service device implements various functions relating to the execution of the application. The middleware-supported functions can be invoked via specific interface calls (e.g., Application Programming Interfaces (APIs) calls), and information is communicated via specific communication ports. For example, middleware on the application service device can serve as an executing entity of the process for inviting participation in an application. The process for inviting participation in an application can be executed by other modules or entities on the application service device.

In some embodiments, the application program for which invitations to participate are extended (e.g., communicated) to participants is required to be running on the application service device. The application program information is acquired in relation to an application program that is running on the application service device. For example, in the event that invitations are to be made to application program participants, acquiring application program information on an application program that an application service terminal is running is required before the invitation is made. In some embodiments, the application program information includes application identification information and run status information. In some embodiments, the application program stores application program information (e.g., at a predefined location such as a configuration or log file) which can be read. In some embodiments, the application program has an API/function call that can provide the application program information. In some embodiments, a server (e.g., a cloud) stores application program information and can provide the application program information (e.g., in response to a query for the application program information).

In some embodiments, the application program identification information includes an application program name, a version serial number, a developer, and other information that can identify the application program. The application program identification information can include information that uniquely identifies the application program.

In some embodiments, the run status information includes operating information on the application program. The operating information on the application program can include a current number of application program users.

Returning to 101, the acquiring of application program information on an application program that an application service device is running can correspond to acquiring application program identification information and run status information. In some embodiments, the application program information (e.g., the application program identification information, the run status information, or the like) can be obtained by a method of querying the application service device of the application program. The method of querying the application service terminal for the application program information includes sending requests for application program information to the application service device at fixed times and receiving the application program information from the application service device in response to the requests for application program information. In some embodiments, middleware on the application service device establishes a connection with the application service device. The connection between the middleware and the application service device can be a persistent connection or a non-persistent connection. The application program information request can be sent via the connection of the middleware to the application service device. In some embodiments, the application service device conducts a query in response to receiving a request associated with the query. For example, the application service device conducts the query after the application service device receives the corresponding request.

According to various embodiments of the present disclosure, the application program in the application service device can be queried using several methods. In some embodiments, the application service device can acquire application program identification information by invoking and analyzing an application list. In some embodiments, a number of current users can be obtained by querying the number of logged in users recorded by the application service device. In some embodiments, the number of current users can be determined by filtering user identification information that uniquely identifies users in application program control data. In some embodiments, the number of current users can be determined by assessing the number of ports of the application service device that are sending/receiving communication information and that are directed at the application program.

According to some embodiments, regardless of the approach used to receive (e.g., query) the application program information from the application service device, after the application service device obtains the application program information, the application service device sends the query result in a predetermined format to the middleware. For example, the predetermined format can be json format, xml format, or the like. In some embodiments, after the middleware obtains feedback data, the middleware can obtain application program information (e.g., application program identification information, use status information or the like) by analyzing the feedback data. For example, in response to receiving feedback data (e.g., in response to a query), the middleware analyzes the feedback data (e.g., parses the received file) to obtain the application program information.

In some embodiments, the acquiring of application program information on an application program that an application service device is running comprises receiving application program information actively issued by the application service device. For example, the application service device updates the application program information at fixed times (e.g., time intervals) and actively sends the application program information to the middleware at fixed times (e.g., time intervals). In some embodiments, the application service device sends the application program information to the middleware without requiring a query for the application program information (e.g., from the middleware).

In some embodiments, the application program information is synchronized with the actual run status of the application program. In some embodiments, the synchronization between the application program information received by the middleware and the actual run status of the application program should be guaranteed. In some embodiments, in the event that the application list is changed or the number of current users changes, the application program information will be synchronously modified. In some embodiments, the synchronous modification of the application program information to reflect changes to the application list or the number of current user changes is made contemporaneous (or synchronous) with the active issuance of application program information at fixed times (e.g., fixed intervals).

For example, the application service device can actively send application program information to the middleware.

In some embodiments, the application program information associated with the application program is acquired by sending a series of requests for application program information to the application service device. The requests of the series of requests can be sent at a predetermined interval. The application program information that the application service device sends in response to at least one of the requests of the series of requests can be received.

After obtaining application program information on an application program that an application service device is running, a determination is made as to whether the application program currently supports participation by others. If the application program currently supports participation by others, the application program can issue invitation information to other users. In some embodiments, in the event that application program information associated with an application program being executed on the application service device is obtained, the application program information can be used to determine whether the corresponding application program supports participation by others.

Referring to FIG. 1, at 102, a determination is made as to whether the application program supports participation by other users. In some embodiments, the application service device can determine (e.g., via the middleware) whether the application program supports participation by other users. The application service device can use the middleware to obtain application program information to determine whether the application program supports participation by other users (e.g., users on other devices). In some embodiments, the determination of whether the application program supports participation by other users can be based at least in part on whether a threshold number of users are currently participating in the application program. For example, the determination of whether the application program currently supports participation by other users can include determining a number of users currently participating in the application program and whether the number of users currently participating in the application program is equal to or greater than a maximum number of users supported by the application program.

In some embodiments, the application program information includes whether the application program supports multi-user participation, and issuance of invitation information associated with a particular application program is based at least in part on whether the particular application program supports participation by other users. For example, the application service device can determine to only invite other users to participate in a particular application program if the particular application program supports participation by a plurality of users (e.g., users that respectively use different devices). If the application program is a multi-person application (e.g., if the application program supports participation by other users), and if the number of people currently participating has not reached the maximum number of users, then invitations may be issued. Conversely, if the application program only permits single-machine applications, or if the application program is a multi-person application (e.g., if the application program supports participation by other users) but the current number of users has reached the maximum number of users supported by the application program, then invitation information is not issued.

In some embodiments, determining whether the application program supports participation by other users comprises acquiring configuration information on the application program; analyzing the configuration information to obtain the maximum number of users supported by the application program; comparing the maximum number of users supported by the application program with the current number of users (e.g., the current number of users participating in the application program) obtained by analyzing the application program information; in the event that the maximum number of users supported by the application program is greater than 1 and the current number of users is less than the maximum number of users supported by the application program, then the application program is determined to support participation by other users; otherwise, the application program is determined to not support participation by other users.

In some embodiments, configuration information on the application program is acquired. The configuration information can be acquired before, or in connection to, determining whether the application program supports participation by other users. The configuration information can be provided by a developer. The configuration information can include application program identification information, application program specification parameters, initial setting parameters, setting schemes for common application scenarios, and the like. The configuration information can be stored as configuration files in ini, xml, dat, cfg, or any other appropriate formats. The configuration information can be invoked and analyzed. For example, the middleware can obtain the configuration file, parse the file to obtain configuration information, and analyze the configuration information (e.g., to determine the maximum number of users supported by the application program).

In some embodiments, the configuration information on an application program that supports participation by more than one user further contains the maximum number of users that are supported by the application program. For example, the maximum number of users that are supported by the application program can correspond to the number of users that can concurrently (e.g., simultaneously) participate in the application program.

In some embodiments, the application program installation files contain one or more configuration files that include configuration information on the application program. The configuration files can be stored in local storage following completion of installation of the application program. The one or more configuration files can be stored on a server and provided to a local device (e.g., an application service device). For example, a local device can query or otherwise receive the one or more configuration files for the application program from a server. In some embodiments, the application program installation files are downloaded from a server, which maintains configuration information and responds to queries of configuration information via a predefined interface (e.g., a specific URL). Other mechanisms to provide configuration information can be used in other embodiments.

In some embodiments, the application service device can obtain and analyze the configuration files. For example, middleware can analyze the configuration information included in a configuration file. In some embodiments, the middleware analyzes received application program information to acquire application program identification information, and the middleware sends the application program identification information and the request for configuration information to the application service device. In response to receiving the request for configuration information of an application program, the application service device can send the configuration information, or the configuration file in which the configuration information is included, to the middleware. For example, the application service device, responding to the request for configuration information, can search for configuration files associated with the application program identification information. The application service device can search for a configuration file that includes the application program identification information.

In the event that the application service device finds a target configuration file (e.g., a configuration file having application program identification information matching the application program identification information communicated in connection with the request for configuration information), the application service device sends the configuration file to the middleware. The application service device can send an identifier (e.g., an alphanumeric string identifier) associated with one or more of the requests for configuration information or the configuration file that is responsive to the request for the configuration information. For example, the application service device can send the application program identification information associated with the configuration file to the middleware. As an example, the application service device can send an identifier of the request for configuration information that was communicated by the middleware to the application service device. The middleware can refer to the request for configuration information to determine the application program to which the configuration file is related.

In the event that the application service device does not find a target configuration file, the application service device can send the search result and the application program identification information to the middleware. Thereafter, the middleware can query a query server that is a preconfigured server provided by the provider of the application, located on the Internet or other network, and configured to provide query results relating to the application programs. For example, in response to receiving an indication from the application service device that the application service devices does not have a configuration file matching the application program identification information, the middleware can query another node (e.g., the query server) for the configuration information.

In some embodiments, configuration information can change over time. Because local storage is limited, and configuration information can change, configuration information can be stored on a query server. The query server can be queried for up-to-date configuration information on the application program. As an example, the configuration files including configuration information can be stored with the query server that is operatively connected to the Internet. The middleware can access the query server using a web-based query (e.g., an HTTP GET request to a preconfigured URL). In some embodiments, the query server includes the configuration files of various application programs. In some embodiments, in the event that an application program developer introduces a new configuration file associated with the application program, the query server can receive the new configuration file. The configuration file can be pushed by the developer to the query server, and the query server can update the configuration file associated with the application program in real time. In some embodiments, the application programs on the application service device can look up (e.g., query) the appropriate configuration information on the query server.

In some embodiments, the application service device can synchronize the configuration files associated with an application program installed on the application service device with the configuration file associated with the application program stored on the query server. For example, to facilitate subsequent queries and raise querying efficiency, the query server synchronizes the application program configuration files associated with the application program to local storage of the application service device by sending the configuration files to the application service device.

In some embodiments, the application service device (e.g., the middleware) can query the query server by sending a request for configuration information of the application program to the query server and receiving configuration information of the application program communicated by the query server (e.g., in response to the query).

In some embodiments, the middleware can use the received application program information to query for the configuration information associated with the application program. For example, the middleware can analyze the received application program information to acquire application program identification information, and the middleware can send the application program identification information and a request for configuration information to the query server. The query server can use the request for configuration information and application program identification information to search for a corresponding configuration file in a query server database operatively connected to the query server. For example, in response to obtaining the request and application program identification information, the query server analyzes content of the request and the application program identification information and searches the configuration files in the query server database.

In the event that the query server finds a target configuration file, the query server can send the configuration file to the middleware. The query server can send the application program identification information in connection with sending the configuration file to the middleware. For example, the query server can package the configuration file and the application program identification information and send the packaged configuration file and corresponding application program identification information to the middleware. In some embodiments, the configuration file includes the corresponding application program identification information (e.g., the configuration file can include an indication of the application program associated therewith).

In the event that the query server does not find a target configuration file (e.g., matching the acquired application program identification information received in connection with the request for configuration information), the query server can send a search result to the application service device (e.g., the middleware). The query server can send application program identification information in connection with the search result to the application service device (e.g., the middleware). In some embodiments, the server can package the search result with the corresponding application program identification information.

The middleware can analyze the received configuration information (e.g., by parsing the received configuration file to identify desired information) and acquire the maximum number of users supported by the application program. In the event that the maximum number of users supported by the application program is not greater than 1, then the invitation process flow ends. In the event that the maximum number of users is greater than 1, then the middleware compares the current number of users in the application program information of the application program (e.g., the number of users currently participating in the application program) with the maximum number of users. In the event that the current number of users is not less than the maximum number of users supported by the application program, then the invitation process flow ends. In contrast, in the event that the current number of users is less than the maximum number of users supported by the application program, then invitations can be issued.

At 103, an invitation can be issued to another user. The invitation is communicated to a user of another device. The invitation can correspond to an invitation to participate in the application program. In the event that the application program supports participation by others, then the application program can issue invitation information on the application program to clients (e.g., devices that are used by other users) that communicate with the application service device.

In some embodiments, a client can communicate with the application service device in the event that the client is connected to the server and can directly transmit data. For example, devices that are connected to the same LAN, devices that are connected to the application service device via Bluetooth, Near Field Communication (NFC), infrared, Wi-Fi Direct, or the like are deemed to be clients that can communicate with the application service device. The client can communicate with the application service device over a wired connection or a wireless connection.

In some embodiments, invitation information includes the application program name, the maximum number of users, the current number of users, a user of the application program running on the application service device, or the like.

In some embodiments, the invitation information is issued according to an indirect communication. For example, the invitation information can be issued (e.g., sent) to all clients that are connected to the application service device. The indirect communication of the invitation information can include sending all related data (e.g., data that is needed to facilitate the invitation or subsequent participation in the application program) to all clients capable of communicating with the application service device. In the event that the clients to which the application service device communicates the invitation information include devices that do not respectively correspond to a smart device, then the data sent to the current non-smart devices can be configured in a data format that can be recognized by such non-smart devices. The application service device, the middleware, or the application program can configure the format in which the invitation information is to be sent. For example, the format in which the invitation information is to be sent can be selected according to a capability of a particular client intended to receive the invitation information. The capability of a particular client can correspond to displaying a request (e.g., using a pop-up window), providing an alert via a vibration, providing an alert via a sound, providing an alert via a light, changing a brightness of a screen, providing an alert via an indicator light, providing an alert via a camera flash, providing an alert according to a change in brightness or color of a light of screen on the client. The format in which the invitation information is to be sent can be selected can be configured according to user preferences (e.g., how a user prefers to receive a prompt or an alert).

In some embodiments, the invitation information can be issued according to a direct communication. For example, the invitation information can be issued (e.g., sent) to one or more specific clients. The direct communication of the invitation information includes acquiring information on clients that can support the application program, sending the client information to the client currently logged into the application program and/or to the application service device, receiving information on clients selected by the client currently logged into the application program, and sending invitation information to the selected clients. The acquiring of information on clients that can support the application program can include issuing (e.g., communicating) support query information relating to the application program to all clients that can communicate with the application service device, and receiving from the clients client information including the respective identification information of the client and the corresponding support query result of the client.

In some embodiments, the issuance (e.g., communication) of invitation information according to direct communication requires that the application service device, the application program, or the middleware determines whether the clients to which the invitation information is to be sent support joining the application program. For example, the application service device, the application program, or the middleware can determine whether a client supports participation in an application program before the invitation information is sent to the client. The middleware can acquire client identification information by searching a database (e.g., stored locally on the application service device or a server such as the query server) and determining whether the client supports joining the application program (e.g., whether the client supports participating in the application program).

In the event that the client does not support joining the application program, then the support query result of the client can correspond to "fails to comply with invitation condition."

In the event that the client supports joining the application program, then middleware can determine whether the client corresponds to a peripheral or smart device. For example, the middleware can use client identification information of a client to determine whether the client is a peripheral or smart device. The middleware analyzes the client identification information of clients that support joining the application program and determines the clients to be peripheral or smart devices. A peripheral device can be a game console, a remote control, the like, or any combination thereof.

In the event that the client is a peripheral device, then the support query result associated with the client can be "Complies with the invitation condition; peripheral." In the event that the client is a smart device, then the support query result for the client can be "Complies with the invitation condition; smart device."

In some embodiments, the client identification information is information that can uniquely identify the client. For example, network devices commonly have a corresponding MAC address and/or IP address. As another example, the identification information for Bluetooth devices is Bluetooth Device Address (BD_ADDR).

In some embodiments, the middleware establishes a one-to-one correspondence between the support query result and the client identification information and then sends the client information to the client currently logged into the application program or to the application service device. For example, the middleware associates the support query result with the corresponding client identification information and provides the associated information to the application program. As an example, the middleware provides the support query result and the client identification information in the form of a list to the user who first logged into the application program. For example, the middleware can provide information to the application that is provided to the user of the application program and that includes information indicating the other devices that support participation in the application program.

The current user of the application program running on the application service device can select which clients to invite to participate in the application program. For example, the current user can input a selection to a user interface presented by the application program or the application service device of one or more other devices that are to be issued invitation information (e.g., sent an invitation to participate). The user who was the first to log into the application can select the other users (e.g., the other devices) to be invited to participate in the application program. The middleware can issue a directional invitation information based on the selection. For example, in response to receiving a selection of the client to be invited to participate in the application program, the middleware can directly communicate invitation information according to the selection. The directional invitations can include client identification information and re-invitation information for the target clients.

The re-invitation information can include invitation information and a prompt request. The prompt request can provide information with which the client (e.g., the other device to which the invitation information is sent) can configure a prompt relating to participation in the application program to the user thereof. For example, in response to receiving the prompt request, the target clients prompt users by a pop-up, a vibration, a sound, or a light. The prompt request can include information indicating the method for prompting the users (e.g., the media with which the prompt is communicated to the user). In the event that the target prompts the user using a light, the prompting of the user can include a change in screen brightness, a flashing or a change in brightness or color of an indicator light, a camera flash of the client, etc.

The user to which the invitation to participate in the application program is communicated can select whether to accept the invitation. The user can input selection to the other device (e.g., the target client) via a user interface. For example, the user can select whether to participate in the application program. The client can send a response to the middleware according to the selection by the user as to whether to accept the invitation. For example, in the event that the user selects to accept the invitation to participate in the application program, the client target can send response information to the middleware. The middleware sends activation information to the client in response to the response information.

In the event that the support query result for the target client indicates that the target client supports joining the application program and the target client is a smart device (e.g., if the support query result corresponds to "Complies with invitation condition; smart device"), then the activation information can include a controller verification request, controller acquisition information, and an activate controller request.

In response to receiving the controller verification request, the target client can determine whether a controller application has been installed. For example, the application service device and the target client can run a controller application. The controller application can facilitate the sending and responding to an invitation to participate in an application program. In the event that a controller application has been installed, the controller verification request can be ignored. In contrast, if a controller application has not been installed, then the target client acquires and installs a controller application. The target client can acquire and install the controller application based at least in part on (e.g., by analyzing) the controller acquisition information. After installation of the controller application on the target client is completed, the target client activates the controller application in response to the activate controller request. An assessment is made on whether there are multiple methods of installing a controller application. For example, the target client can determine whether a controller application has been installed by comparing application program identification information, scanning an application program list, or scanning a system registration list. In the event that multiple methods of installing the controller application, the target client can select a method to install the controller application.

In the event that the support query result for the target client indicates that the target client supports joining the application program and the target client is a peripheral device (e.g., if the support query result corresponds to "Complies with invitation condition; peripheral device"), then activation information can include an activation request and access information. In response to receiving the activation request, the target client can access the application program based at least in part on the access information.

The application service device (e.g., the middleware) can directly communicate invitation information to a target client using client identification information of the target client (e.g., a MAC address of the target client, using an IP address of the target client, or the like).

In the event that the client identification information corresponds to a MAC address, the middleware packages the invitation information and client identification information and sends the packaged invitation information and client identification information to each node. In response to receiving the packaged invitation information and client identification information, the client at each node filters the packaged invitation information and client identification information and acquires data containing, or otherwise corresponding to, the MAC address of the client. For example, in response to receiving the packaged invitation information and client identification information, a client can determine whether the packaged invitation information and client identification information corresponds to the client. In the event that the packaged invitation information and client identification information corresponds to the client, the client can extract, or otherwise use, information from the packaged invitation information and client identification information. In the event that the packaged invitation information and client identification information does not correspond to the client, the client can ignore the packaged invitation information and client identification information.

In the event that the client identification information corresponds to an IP address, the middleware can use the target client address as a data packet address. The middleware can send the data packet to the network. In response to receiving the data packet from the middleware, the network can send the data packet to the target node (e.g., the target node associated with the target client address).

In some embodiments, a method for inviting participation in application programs such as method 100 of FIG. 1 can include receiving information on whether a client has accepted an invitation. In some embodiments, a method for inviting participation in application programs such as method 100 of FIG. 1 can include permitting clients who comply with a condition to join the application program. The condition to join the application program can correspond to verification that a client can support the application program or support participation in the application program. The condition to join the application program can correspond to a condition that the client corresponds to a particular type of device, that the client is logged in as, or otherwise associated with, a particular user profile, the like, or any combination thereof. As an example, a condition with which a client may be required to comply in order to join the application program can include a compatibility condition, a Quality of Service (QoS) condition (e.g., a connection speed, a bandwidth, a response time, or the like), or other appropriate parameters.

The receiving information on whether a client has accepted an invitation can include the middleware receiving a client response to invitation information, analyzing the client response to the invitation information, and determining whether the invitation was accepted.

The permitting clients who comply with the condition to join the application program can include, in the event that a client satisfies an access condition, the middleware opening a communication port directed at the application program for the client for access to the corresponding application program.

An example of a method for inviting participation in an application program is provided to assist with understanding the method for inviting participation in an application program. However, the example of the method for inviting participation in an application program is merely an explanation of a specific instance of an application. The method for inviting provided by the present application is not limited to this specific application instance.

As an example, a plurality of devices are connected to a network. For example, referring to FIG. 7, a plurality of devices (e.g., devices 701-704) can be connected to the network 705. The plurality of devices 701-704 can respectively correspond to a Smart Television A, a Tablet Computer C, a Smart Phone D, and a Gamepad E. The Smart Television A, the Tablet Computer C, the Smart Phone D, and the Gamepad E are respectively connected to the same network (e.g., a Router F). The devices can be connected to the Router F via a wired connection or a wireless connection.

The connection of the plurality of devices corresponds to a network connection. In some embodiments, the application service device, the application program installed on the application service device, or the middleware can have a default connection type. According to the present example, the default selection is that the device MAC address is the client identification information. In some embodiments, the devices can be connected via a wired connection or a wireless connection. The plurality of devices can be connected directly via a wired connection or a wireless connection, or indirectly via one or more routers or other networking devices, or the like.

Continuing with the example above, User I activates a Car Racing Game B on Smart Television A. After the Car Racing Game B starts, the smart system of Smart Television A updates the application program information. The smart system performs an analysis and acquires the application program identification information for the Car Racing Game B. The system of Smart Television A can scan controller data for Car Racing Game B, obtains client identification information, filters the client identification information, counts the quantity of client identification information, and determines that only one piece of client identification information exists. In other words, the smart system determines that the number of clients is 1.

The smart system of Smart Television A sends a data packet including the application program identification information and the current number of users to the middleware.

The middleware receives application program information sent by the smart system of the application service device (e.g., Smart Television A). The middleware performs an analysis and obtains the application program identification information and the current number of users.

The middleware sends the application program identification information for Car Racing Game B and a request for configuration information to the application service device. The middleware can send the application program identification information for Car Racing Game B and a request for configuration information to the application service device to a query server.

In response to receiving the query including the application program identification information for Car Racing Game B and a request for configuration information, the query can be analyzed and the query data (e.g., the application program identification information for Car Racing Game B and a request for configuration information) can be obtained (e.g., extracted). For example, in response to a query server receiving the query data, the query server analyzes the query data and obtains the application program identification information and the request for configuration information.

The query server can perform a database query using the application program identification information. For example, the query server can query a database to determine the corresponding configuration information by using the application program identification information. As an example, in response to receiving the request for configuration information, the query server performs a scan in a database using the application program identification information as the keyword. After the query server finds a target configuration file (e.g., a target configuration file having a corresponding application program identification information matching the application program identification information included in the query data), the query server sends the target configuration file and application program identification information to the middleware.

In the event that the middleware receives the data sent by the query server (e.g., the target configuration file and application program identification information), the middleware acquires the configuration information for Application Program B. The middleware filters Application Program B configuration information and obtains the maximum number of users, which is 2, from the Application Program B configuration information.

The middleware compares the current number of users with the maximum number of users (e.g., 2). According to this example, the maximum number of users is greater than 1, and the current number of users is less than the maximum number of users.

The middleware sends to all clients (e.g., all clients connected to the network) invitation information containing support query request information, the name of the application program, the maximum number of users, the current number of users, access user ID, and other such information.

In the event that Client C receives the invitation information, Client C responds to the support query request information by sending client identification information to the middleware. In the event that the middleware receives a response from Client C including the corresponding client identification information associated with Client C, the middleware compares the client identification information with the support device database of Car Racing Game B. In the event that the middleware does not find client identification information for Client C, the middleware can deem Client C as unable to support Car Racing Game B. In other words, Client C may not support participation in the application program (e.g., Car Racing Game B). The support query result can correspond to "Fails to comply with the invitation condition."

In the event that Client D receives the invitation information, Client D responds to the support query request information by sending client identification information to the middleware. In the event that the middleware receives a response from Client D including the corresponding client identification information associated with Client D, the middleware compares the client identification information with the support device database of Car Racing Game B. In the event that the middleware finds client identification information for Client D, the middleware can deem Client D as able to support Car Racing Game B and the middleware can determine that Client D corresponds to a smart device based at least in part on the client identification information for Client D. The smart query result can correspond to "Complies with the invitation condition; smart device."

In the event that Client E receives the invitation information, Client E responds to the support query request information by sending client identification information to the middleware. In the event that the middleware receives a response from Client E including the corresponding client identification information associated with Client E, the middleware compares the client identification information with the support device database of Car Racing Game B. In the event that the middleware finds client identification information for Client E, the middleware can deem Client E as able to support Car Racing Game B. The middleware can determine that Client E corresponds to a peripheral device based at least in part on the client identification information for Client E. The support query result can correspond to "Comply with the invitation condition; peripheral device."

The middleware presents all client identification information and support query results in list form on the smart television (e.g., Smart Television A).

Continuing with the example described above, User I, who was the first user to log into Car Racing Game B, selects Client D. The middleware issues re-invitation information based on the user's selection (e.g., based on selection of Client D). The re-invitation information includes the MAC address and invitation information for target Client D. In response to Client D receiving the re-invitation information, Client D presents the invitation information to the user thereof in the form of a pop-up window, sound, or vibrations.

The user of Client D chooses to accept the invitation, and the target client D sends response information to the middleware.

The middleware sends activation information to Client D. The middleware can send the activation information to Client D in response to the middleware receiving the response information associated with the acceptance of the invitation by Client D. The activation information can include a controller verification request, controller acquisition information, and an activate controller request. In response to receiving the controller verification request, Client D determines whether a controller has been installed thereon. In the event that a controller has been installed on Client D, Client D ignores the request. In the event that no controller has been installed on Client D, then Client D acquires and installs a controller by analyzing the controller acquisition information. After installation is completed, Client D activates the controller in response to the activate controller request.

The middleware opens a single communication port for Client D and permits control data with the MAC address information of Client D to pass through this port into Car Racing Game B. Client D can now participate in the application program with User I using a communication channel between Client D and the communication port opened by the middleware.

Figure 2:
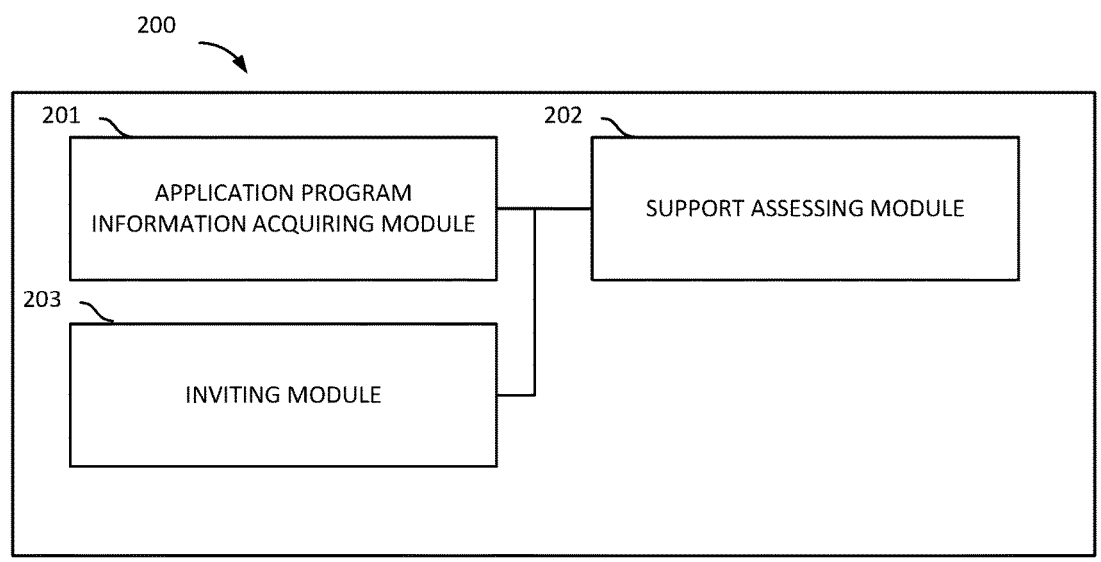
FIG. 2 is a diagram of a device for inviting participation in application programs according to various embodiments of the present disclosure of the present application.

FIG. 2 is a diagram of a device for inviting participation in application programs according to various embodiments of the present disclosure of the present application.

Referring to FIG. 2, a device 200 for inviting participation in an application program is provided. In some embodiments, device 200 implements method 100 of FIG. 1. In some embodiments, the device 200 is implemented by system 700 of FIG. 7.

The device 200 includes an application program information acquiring module 201, a support assessing module 202, and an inviting module 203.

The application program information acquiring module 201 can be configured to acquire application program information that is currently running on an application service device such as the 200.

In some embodiments, the application program information acquiring module 201 includes an application program information query request module that is configured to send requests for application program information to the application service device at fixed times. The application program information acquiring module 201 can include an application program information query receiving module configured to receive the application program information sent back by the application service terminal in response to a request for application program information.

In some embodiments, the application program information acquiring module 201 includes an application program information receiving module configured to receive application program information actively issued by the application service device.

The support assessing module 202 can be configured to determine whether the application program supports participation by others users or devices.

In some embodiments, the support assessing module 202 includes a configuration information acquiring module configured to acquire configuration information on the application program. The support assessing module 202 can include a configuration information analyzing module for analyzing the configuration information on the application program to obtain the maximum number of users for the application program. For example, the configuration information analyzing module can determine a maximum number of users that are able to concurrently (e.g., simultaneously) participate in the application program. The support assessing module 202 can include a comparing and assessing module configured to compare the maximum number of users with the current number of users obtained by analyzing the application program information. In the event that the maximum number of users is greater than 1 and the current number of users is less than the maximum number of users, then the comparing and assessing module can determine that the application program supports participation by other users or devices; otherwise, the comparing and assessing module can determine that the application program does not support participation by other users or devices.

In some embodiments, the configuration information acquiring module of the support assessing module 202 includes a configuration information acquiring request module configured to send a request for the application program configuration information to the query server. In some embodiments, the configuration information acquiring module of the support assessing module 202 includes a configuration information acquiring and receiving module configured to receive application program configuration information sent by the query server.

In some embodiments, the configuration information acquiring module of the support assessing module 202 includes a configuration information querying module configured to acquire configuration information on the application program by querying the local application program configuration file at the application service device. The local configuration file at the application service terminal can periodically stay synchronized with the corresponding configuration file of the query server.

The inviting module 203 can be configured to issue (e.g., communicate) invitation information for the application program to clients (e.g., other devices) capable of communicating with the application service device in the event that the application program supports participation by other users or devices.

In some embodiments, the inviting module 203 includes an invitation information issuing module configured to issue (e.g., communicate) invitation information on the application program to all clients that can communicate with the application service device.

In some embodiments, the inviting module 203 includes a client information acquiring module configured to acquire information on clients that can support the application program. The inviting module 203 can include a client information sending module configured to send the client information to the client currently logged into the application program and/or to the application service device. The inviting module 203 can include a directional sending module configured to receive information on client devices selected by the client currently logged into the application program and to send invitation information to the selected clients. In some embodiments, a client device corresponds to an application service device.

The client information acquiring module of the inviting module 203 can include a support query request issuing module configured to issue (e.g., communicate) support query requests relating to the application program to all clients that can communicate with the application service device. The client information acquiring module of the inviting module 203 can include a support query result receiving module configured to receive, from the clients, client information including the identification information associated with the respective client and the support query result associated with the respective client.

In some embodiments, the device 200 can include a response module configured to receive information on whether a client accepts the invitation to participate in the application program. In some embodiments, the device 200 can include an access module configured to provide access to clients that comply with conditions to the application program.

Figure 3:
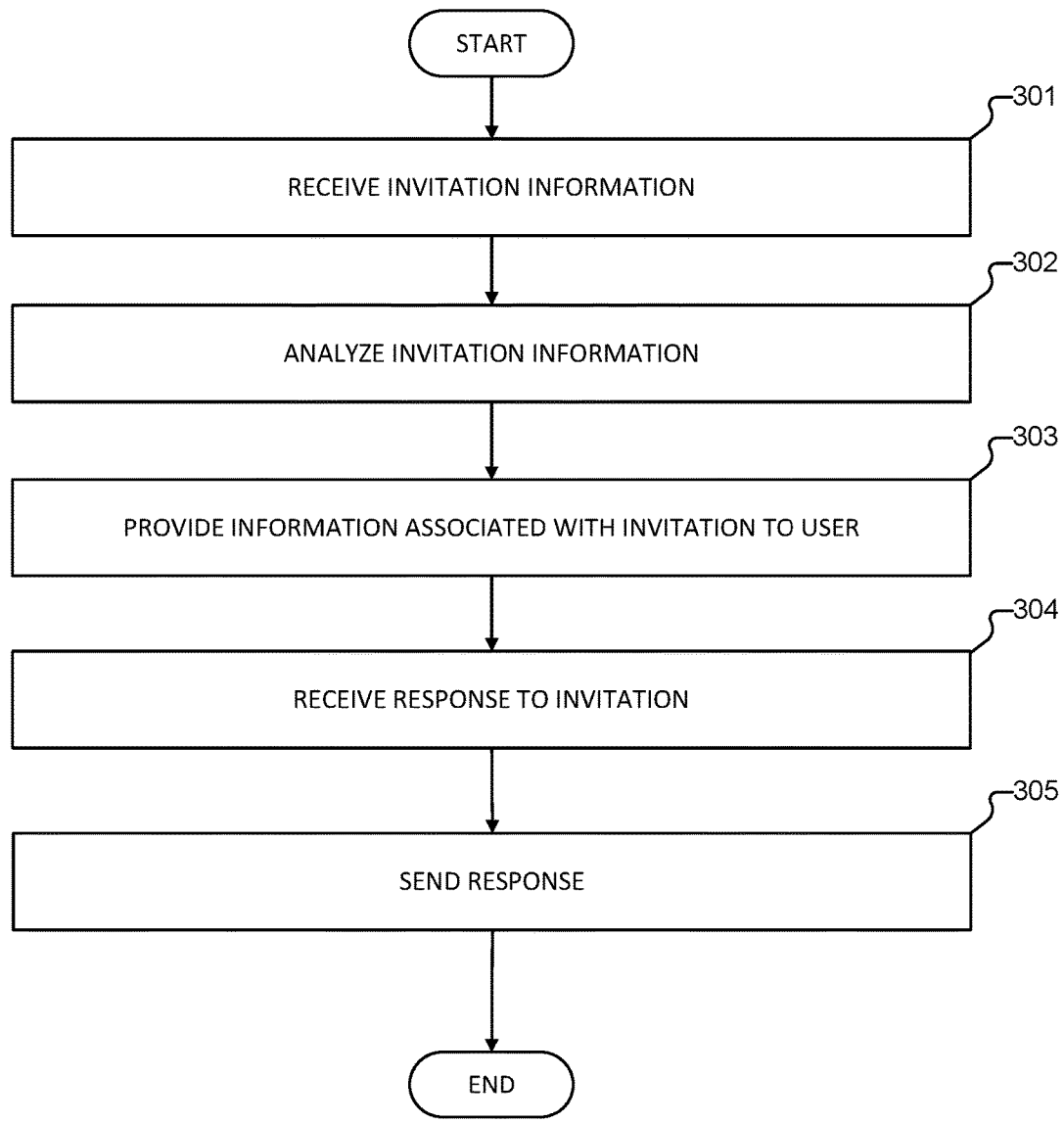
FIG. 3 is a flowchart of a method for responding to invitations according to various embodiments of the present application.

FIG. 3 is a flowchart of a method for responding to invitations according to various embodiments of the present application.

Referring to FIG. 3, a method 300 for responding to invitations to join an application program is provided. In some embodiments, device 400 of FIG. 4 implements the method 300. In some embodiments, system 700 implements the method 300.

At 301, invitation information is received. In some embodiments, the invitation information is received by a client (e.g., an application service device). The client can receive the invitation information from an application service device, a server, or the like. The invitation information can be associated with an application program. For example, the invitation information can correspond to an invitation to participate in an application program with another user (e.g., a user of a device operatively connected, via a wired connection or a wireless connection to the client).

At 302, the invitation information is analyzed. In some embodiments, the client can analyze the invitation information in response to the client receiving the invitation information. The analysis of the invitation information can include extracting at least a subset of information from the invitation information.

At 303, information associated with the invitation corresponding to the invitation information is provided. In some embodiments, information associated with the invitation corresponding to the invitation information can be presented to a user of the client. As an example, at least a subset of information from the invitation information received can be extracted and presented to a user. The information associated with the invitation corresponding to the invitation information can provide an indication that an invitation is received, an indication of the application service device from which the invitation is received, an indication of the application program associated with the invitation, or the like. In some embodiments, the information associated with the invitation corresponding to the invitation information presented to the user can include a mechanism by which a user can input a response to the invitation. For example, a user interface can be displayed to the user. The user can interface with the user interface to accept, deny, or ignore the invitation. In some embodiments, the presenting of the information associated with the invitation information can include providing an alert to the user that indicates that an invitation is received. In some embodiments, the presenting of the information associated with the invitation information can include prompting the user to respond to the invitation. The prompting of the user can include prompting a user on whether to participate in the application program by a pop-up, a vibration, a sound, or a light.

At 304, a response to the invitation is received. In some embodiments, the client receives a response to the invitation via a user interface by which a user input the response. The response can include response information. The response information can include an indication of whether the user accepts the invitation, conditions associated with acceptance of the invitation, and a message input by the user to be sent to a user of the application service device.

At 305, the response is sent. In some embodiments, the client sends the response to the application service device in response to receiving the response from the user of the client. The client can send the response information to the application service device.

Figure 4:
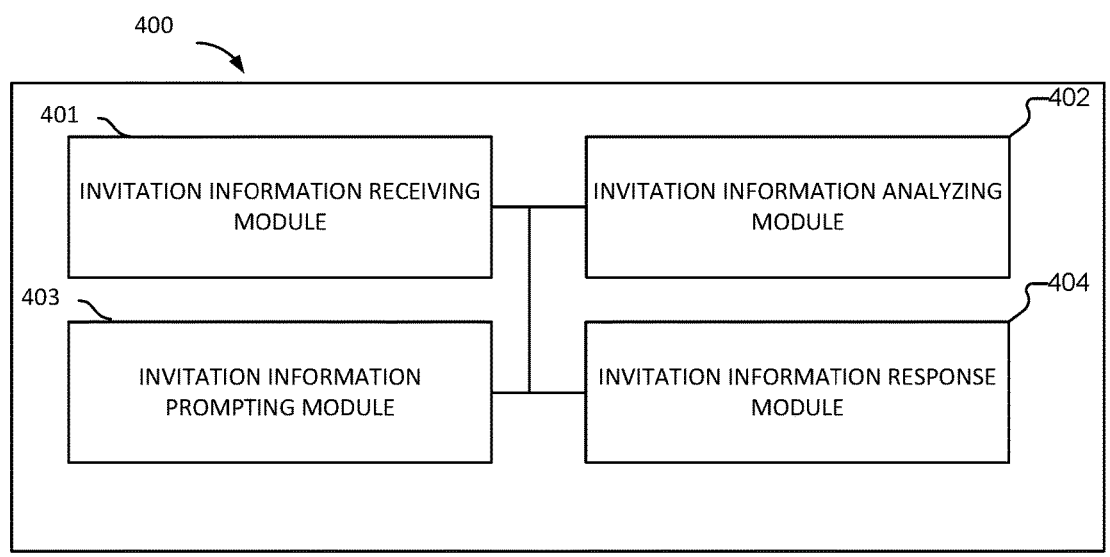
FIG. 4 is a diagram of a device for responding to invitations according to various embodiments of the present disclosure of the present application.

FIG. 4 is a diagram of a device for responding to invitations according to various embodiments of the present disclosure of the present application.

Referring to FIG. 4, a device 400 configured to respond to an invitation to participate in an application program is provided. In some embodiments, device 400 implements method 300 of FIG. 3. In some embodiments, the device 400 is implemented by system 700 of FIG. 7.

The device 400, configured to respond to an invitation to participate in an application program, includes an invitation information receiving module 401, an invitation information analyzing module 402, an invitation information prompting module 403, and an invitation information response module 404.

In some embodiments, the invitation information receiving module 401 is configured to receive invitation information for the application program. The invitation information receiving module 401 can receive the invitation information from an application service device, a server, or the like. The invitation information can be associated with an application program. For example, the invitation information can correspond to an invitation to participate in an application program with another user (e.g., a user of a device operatively connected, via a wired connection or a wireless connection, to the client).

In some embodiments, the invitation information analyzing module 402 is configured to analyze invitation information. In some embodiments, the invitation information analyzing module 402 can analyze the invitation information in response to the invitation information receiving module 401 receiving the invitation information. The invitation information analyzing module 402 can extract at least a subset of information from the invitation information.

In some embodiments, the invitation information prompting module 403 is configured to provide information associated with the invitation corresponding to the invitation information. The invitation information prompting module 403 can present to a user (e.g., of the device 400) information associated with the invitation corresponding to the invitation information. As an example, at least a subset of information from the invitation information received can be extracted and presented to a user. The information associated with the invitation corresponding to the invitation information can provide an indication that an invitation is received, an indication of the application service device from which the invitation is received, an indication of the application program associated with the invitation, or the like. In some embodiments, the information associated with the invitation corresponding to the invitation information presented to the user can include a mechanism by which a user can input a response to the invitation. For example, a user interface can be displayed to the user. The user can interface with the user interface to accept, deny, or ignore the invitation. In some embodiments, the invitation information prompting module 403 provides an alert to the user that indicates that an invitation is received. In some embodiments, the invitation information prompting module 403 prompts the user to respond to the invitation. The invitation information prompting module 403 can prompt a user on whether to participate in the application program by a pop-up, a vibration, a sound, or a light.

In some embodiments, the invitation information response module 404 is configured to receive a response. The invitation information response module 404 can receive a response to the invitation via a user interface by which a user input the response. The response can include response information. The response information can include an indication of whether the user accepts the invitation, conditions associated with acceptance of the invitation, and a message input by the user to be sent to a user of the application service device.

The invitation information response module 404 can be configured to send a response. For example, the invitation information response module 404 can be configured to send a response to the application service device. In some embodiments, the invitation information response module 404 sends the response to the application service device in response to receiving the response from the user of the client.

Figure 5:
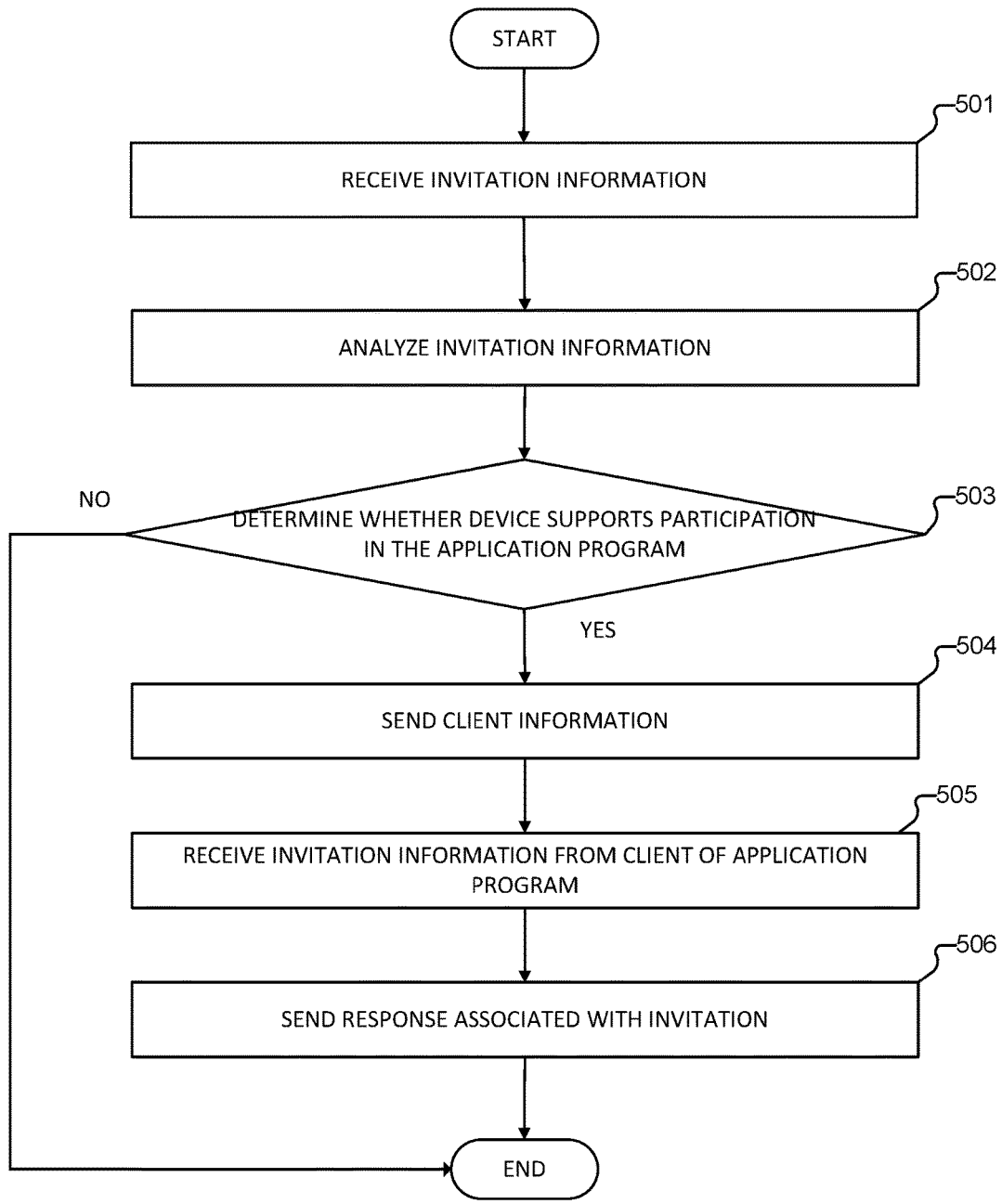
FIG. 5 is a flowchart of a method for responding to invitations according to various embodiments of the present disclosure of the present application.

FIG. 5 is a flowchart of a method for responding to invitations according to various embodiments of the present disclosure of the present application.

Referring to FIG. 5, a method 500 for responding to an invitation to participate in an application program is provided. In some embodiments, the method 500 is implemented by device 600 of FIG. 6. In some embodiments, the method 500 is implemented by system 700 of FIG. 7.

At 501, invitation information is received. For example, invitation information for the application program is received. The invitation information can correspond to, or otherwise relate to, an invitation to participate in an application program. The invitation information can be received from the application service device (e.g., the middleware interfacing with the application program issuing the invitation).

At 502, the invitation information is analyzed. The client that receives the invitation information can analyze the invitation information. In some embodiments, the client can analyze the invitation information in response to the client receiving the invitation information. The analysis of the invitation information can include extracting at least a subset of information from the invitation information.

At 503, a determination is made as to whether the client supports participation in the application program. In some embodiments, the client determines whether the client supports multi-user participation in the application program. For example, the client determines whether the client can support joining an application program running on, or otherwise hosted by, the application service device. The determination of whether the client supports the participation in the application program can be based at least in part on the analyzing of the invitation information, and examining the client's capabilities.

In some embodiments, in the event that the client is determined to not support participation in the application program, the method 500 can end. As an example, the client can send an indication that the client does not support participation in the application program to the application service device. As another example, the client can ignore the invitation information (and not provide a response to the application service terminal) if the client does not support participation in the application program.

In the event that the client is determined to support participation in the application program, at 504, client information is sent. For example, the client can send to the application service device client information comprising the identification information of the client and information that indicates whether the client supports the application program.

At 505, invitation information is received from a client of the application program. For example, the client receives invitation information issued (e.g., communicated) from an online client of the application program.

The invitation information received at 501 can correspond to an indication that a client is willing or able to participate in an application program. The invitation information received at 501 can be broadcast. In the event that the invitation information 501 is sent, the client can wait for an invitation. The invitation information received at 505 can correspond to an access request. In the event that the client satisfies a condition for participating in the application program, then the invitation information received at 505 can be sent to the client.

At 506, a response associated with the invitation is sent. In some embodiments, the client sends a response associated with the invitation. For example, the client can send a response associated with the invitation to the application service terminal. The response can indicate whether the client will participate in the application program. For example, the response can confirm the participation of the client in the application program. In some embodiments, the client can generate the response to the invitation based at least in part on the invitation information received from the client of the application program.

Figure 6:
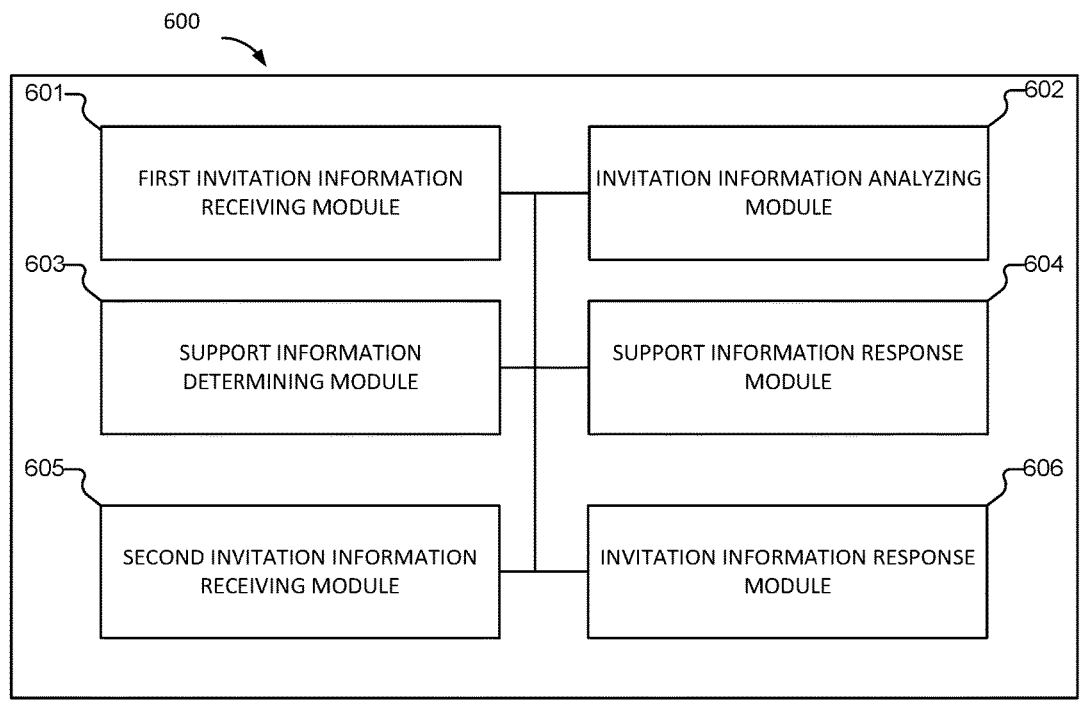
FIG. 6 is a diagram of a device for responding to invitations of the present application.

FIG. 6 is a diagram of a device for responding to invitations of the present application.

Referring to FIG. 6, a device 600 configured to respond to an invitation to participate in an application program is provided. In some embodiments, device 600 implements method 500 of FIG. 5. In some embodiments, the device 600 is implemented by system 700 of FIG. 7.

The device 600 configured to respond to an invitation to participate in an application program includes a first invitation information receiving module 601, an invitation information analyzing module 602, a support information determining module 603, a support information response module 604, a second invitation information receiving module 605, and an invitation information response module 606.

The first invitation information receiving module 601 can be configured to receive invitation information. For example, the first invitation information receiving module 601 can receive invitation information for the application program. The invitation information can correspond to, or otherwise relate to, an invitation to participate in an application program. The first invitation information receiving module 601 can receive the invitation information from the application service device (e.g., the middleware interfacing with the application program issuing the invitation).

The invitation information analyzing module 602 can be configured to analyze invitation information. The invitation information analyzing module 602 can analyze the invitation information in response to the first invitation information receiving module 601 receiving the invitation information. The analysis of the invitation information can include extracting at least a subset of information from the invitation information.

The support information determining module 603 can be configured to determine whether the client supports participation in the application program. The support information determining module 603 determines whether the client supports multi-user participation in the application program. For example, the support information determining module 603 determines whether the client can support joining an application program running on, or otherwise hosted by, the application service device. The support information determining module 603 can determine whether the client supports the participation in the application program based at least in part on the analyzing of the invitation information.

The support information response module 604 can be configured to send, in the event that participation in the application is supported (e.g., by the device 600), client information. The support information response module 604 can send information on the supporting client and information that participation in the application program can be supported to the application service device (e.g., middleware of the application service terminal). The client information can include identification information of the client and information that indicates whether the client supports the application program.

The second invitation information receiving module 605 can be configured to receive invitation information from a client of the application program. For example, the second invitation information receiving module 605 can receive invitation information issued from the online client of the application program. The invitation information issued from the online client of the application program can be forwarded to the client (e.g., the second invitation information receiving module 605) by the middleware in the application service device.

The invitation information response module 606 can be configured to send a response to the invitation. The invitation information response module 606 can send a response associated with the invitation to the application service terminal (e.g., the middleware of the application service terminal). The response can indicate whether the client will participate in the application program. For example, the response can confirm the participation of the client in the application program. In some embodiments, the invitation information response module 606 can generate the response to the invitation based at least in part on the invitation information received from the client of the application program.

Figure 7:
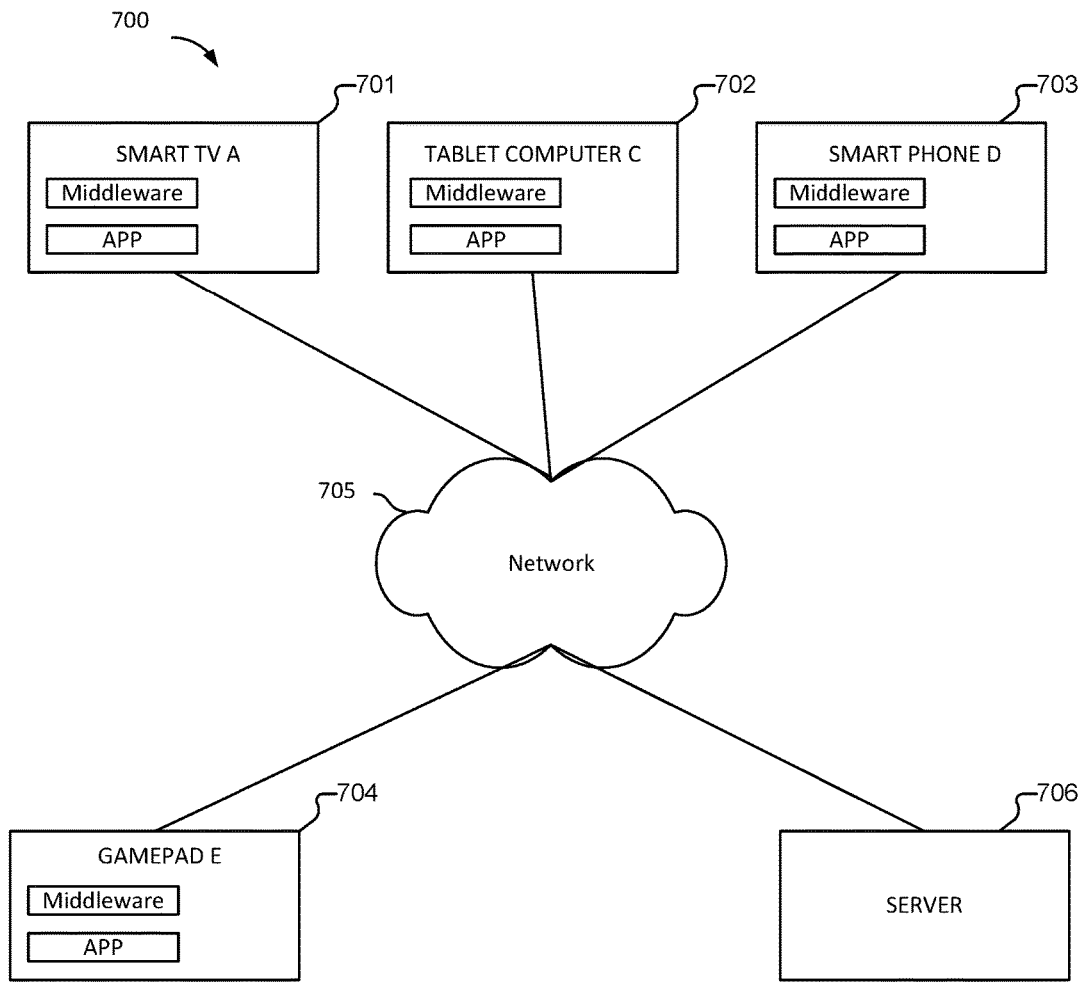
FIG. 7 is a structural block diagram of a system for participating in an application program according to various embodiments of the present application.

FIG. 7 is a structural block diagram of a system for participating in an application program according to various embodiments of the present application.

Referring to FIG. 7, a system 700 for multi-user or multi-device participation in an application program is provided. In some embodiments, the system 700 implements the method 100 of FIG. 1. In some embodiments, the system 700 implements the device 200 of FIG. 2. In some embodiments, the system 700 implements the method 300 of FIG. 3. In some embodiments, the system 700 implements the device 400 of FIG. 4. In some embodiments, the system 700 implements the method 500 of FIG. 5. In some embodiments, the system 700 implements the device 600 of FIG. 6.

The system 700 for multi-user or multi-device participation in an application program includes an application service device 701 (e.g., a Smart Television A), a device 702 (e.g., a Tablet Computer C) for inviting participation in an application program, a first device 703 (e.g., a Smart Phone D) for responding to an invitation to participate in an application program, and a second device 704 (e.g., a Gamepad E) for responding to an invitation to participate in an application program.

In some embodiments, the device 702 implements the method 100 of FIG. 1. For example, the device 702 can correspond to device 200 of FIG. 2.

In some embodiments, the device 703 implements the method 300 of FIG. 3. For example, the device 703 can correspond to device 400 of FIG. 4.

In some embodiments, the device 704 implements the method 500 of FIG. 5. For example, the device 704 can correspond to device 600 of FIG. 6.

The system 700 can include a network 705 over which one or more of the devices (e.g., devices 701-704) communicate. The network 705 can be a LAN, a Wide Area Network (WAN), the Internet, or the like. In some embodiments, the various devices of the system 700 (e.g., devices 701-704) can communicate over a direct connection between one another (e.g., a WiFi Direct connection, a Bluetooth connection, an infrared connection, or the like).

The system 700 can include a server 706. The server 706 can be configured to respond to query requests from one or more of the devices of the system 700 (e.g., devices 701-704). The server 706 can be configured to host an instance of the application program or the like. For example, the server 706 can host a client of the application program. The client can organize, or otherwise manage, the multi-user or multi-device participation in the application program. For example, the server 706 can select one or more of the devices of the system 700 to invite to participate in the application program. The server 706 can extend (e.g., issue or communicate), to a device of the system 700, an invitation to participate in the application program.

Figure 8:
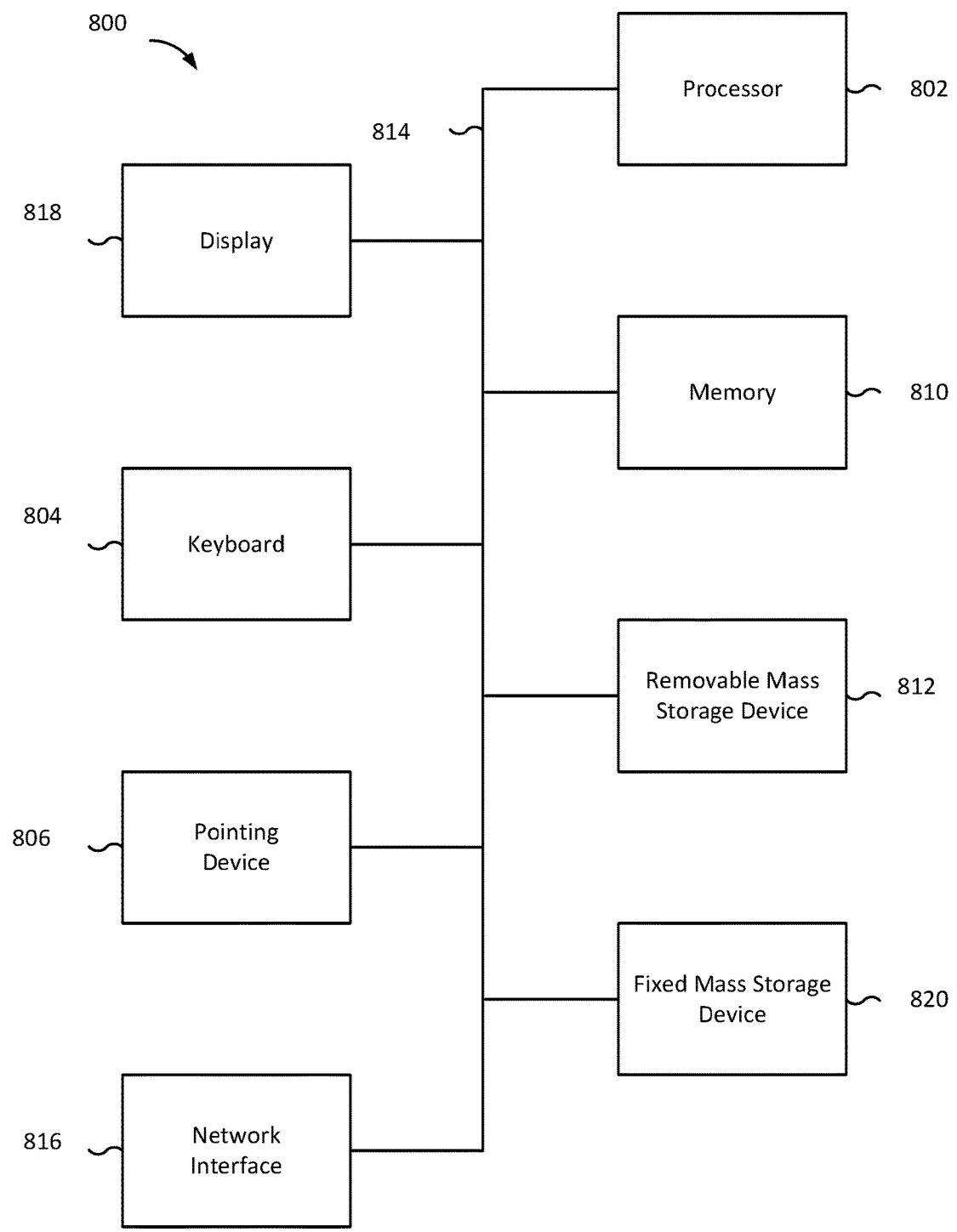
FIG. 8 is a functional diagram of a computer system for inviting a device to participate in an application program according to various embodiments of the present application.

FIG. 8 is a functional diagram of a computer system for inviting a device to participate in an application program according to various embodiments of the present application.

Referring to FIG. 8, a computer system 800 for accessing a website or for determining whether a terminal accessing the website is a mobile terminal is provided. As will be apparent, other computer system architectures and configurations can be used to implement video calls. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818).

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer-readable storage media, described below, depending on whether, for example, data access needs to be bi-directional or uni-directional. For example, processor 802 can also directly and very rapidly retrieve and store frequently needed data in a cache memory (not shown). The memory can be a non-transitory computer-readable storage medium.

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storage device 812 and fixed mass storage 820 generally store additional programming instructions, data, and the like that typically are not in active use by the processor 802. It will be appreciated that the information retained within mass storage device 812 and fixed mass storage 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

The above-described are merely preferred embodiments of the present application and do not serve to limit the present application. Any modifications, equivalent substitutions, or improvements that are performed shall be contained within the protective scope of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
acquiring, at middleware of an application service device, application program information associated with an application program executed by the application service device, the application program information comprising configuration information and run status information;
determining, by the middleware of the application service device, whether the application program supports participation by another application service device, the determining of whether the application program supports participation by the other application service device being based at least in part on the application program information, wherein the configuration information comprises information indicating a maximum number of users supported by the application program, and the run status information comprises a number of users currently participating in the application program;

in response to at least determining that the application program supports participation by another application service device, causing the middleware of the application service device to send invitation information associated with the application program to a client device that is connected to the application service device, wherein the client device to which the invitation information is sent is determined based at least in part on a determination of a capability of the client device; and in response to receiving an indication that the client device has accepted an invitation corresponding to the invitation information, causing the middleware of the application service device to send activation information to the client device, the activation information comprising information to be used in connection with configuring the client device to participate in the application program with the application service device.

2. The method of claim 1, wherein the acquiring application program information associated with the application program comprises:

sending a series of requests for application program information to the application service device, wherein the requests of the series of requests are sent at predetermined intervals; and receiving application program information that the application service device sends in response to at least one of the requests of the series of requests.

3. The method of claim 1, wherein the acquiring application program information associated with the application program comprises:

receiving application program information that is issued by the application service device.

4. The method of claim 1, wherein the determining of whether the application program supports participation by another application service device comprises:

acquiring the configuration information associated with the application program;

determining the maximum number of users supported by the application program based at least in part on the configuration information;

determining the current number of users currently participating in the application program;

comparing the maximum number of users and the current number of users; and in response to a determination that the maximum number of users is greater than 1, and that the current number of users is fewer than the maximum number of users, determining that the application program supports participation by another application service device;

in response to a determination that the maximum number of users is no greater than 1, or that the current number of users is not fewer than the maximum number of users, determining that the application program does not support participation by another application service device.

5. The method of claim 4, wherein the acquiring of configuration information associated with the application program comprises:

sending a request for configuration information associated with the application program to a query server; and receiving the configuration information associated with the application program that is sent by the query server in response to the request for the configuration information.

6. The method of claim 4, wherein the acquiring of configuration information on the application program comprises:

acquiring the configuration information associated with the application program by querying a local application program configuration file stored at the application service device, wherein the local configuration file stored at the application service device is periodically synchronized with a corresponding configuration file stored at a query server.

7. The method of claim 1, wherein the causing of invitation information associated with the application program to be sent comprises:

causing invitation information associated with the application program to be sent to all client devices that are connected to the application service device.

8. The method of claim 1, wherein causing of invitation information associated with the application program to be sent comprises:

acquiring information associated with the client device that supports the application program;

causing the client information to be provided to a user currently logged into the application program or the application service device;

receiving information on a selected client device that is selected by the user currently logged into the application program; and causing the invitation information to be sent to the selected client device.

9. The method of claim 8, wherein the acquiring of information associated with the client device that supports the application program comprises:

sending a support query request relating to the application program to all client devices that are connected to the application service device; and receiving, from the client device, client information including identification information corresponding to the client device from which the client information is received, and a support query result.

10. The method of claim 1, further comprising:

receiving information associated with whether the client device accepts an invitation associated with the invitation information to participate in the application program; and in response to a determination that the client device accepts the invitation to participate in the application program, providing access to the client device provided that the client device satisfies an access condition of the application program.

11. The method of claim 1, wherein the application program information from which it is determined whether the application supports participation by another application service device comprises information that uniquely identifies the application program.

12. The method of claim 1, further comprising:

obtaining run status information associated with the application program, wherein the run status information indicates a current operating status of the application program, and wherein the application program information comprises information indicating one or more capabilities of the application program.

13. The method of claim 1, further comprising:
generating the invitation information associated with the application program using the application program information.

14. A device, comprising:
at least one processor configured to:
   acquire, at middleware of an application service device, application program information associated with an application program executed by the application service device, the application program information comprising configuration information and run status information;
   determine, by the middleware of the application service device, whether the application program supports participation by another application service device, to determine whether the application program supports participation by the other application service device being based at least in part on the application program information, wherein the configuration information comprises information indicating a maximum number of users supported by the application program, and the run status information comprises a number of users currently participating in the application program;
   in response to at least determining that the application program supports participation by another application service device, cause the middleware of the application service device to send invitation information associated with the application program to be a client device that is connected to the application service device, wherein the client device to which the invitation information is sent is determined based at least in part on a determination of a capability of the client device; and
   in response to receiving an indication that the client device has accepted an invitation corresponding to the invitation information, causing the middleware of the application service device to send activation information to the client device, the activation information comprising information to be used in connection with configuring the client device to participate in the application program with the application service device; and
a memory coupled to the at least one processor and configured to provide the at least one processor with instructions.

15. The device of claim 14, wherein the at least one processor is further configured to:
send a series of requests for application program information to the application service device, wherein the requests of the series of requests are sent at predetermined intervals; and
receive application program information that the application service device sends in response to at least one of the requests of the series of requests.

16. The device of claim 14, wherein the at least one processor is further configured to:
receive application program information that is issued by the application service device.

17. The device of claim 14, wherein the at least one processor is further configured to:
acquire the configuration information associated with the application program;
determine the maximum number of users supported by the application program based at least in part on the configuration information;
determine the current number of users currently participating in the application program;
compare the maximum number of users and the current number of users; and
in response to a determination that the maximum number of users is greater than 1, and that the current number of users is fewer than the maximum number of users, determine that the application program supports participation by another application service device;
in response to a determination that the maximum number of users is no greater than 1, or that the current number of users is not fewer than the maximum number of users, determine that the application program does not support participation by another application service device.

18. The device of claim 17, wherein the at least one processor is further configured to:
send a request for configuration information associated with the application program to a query server; and
receive the configuration information associated with the application program that is sent by the query server in response to the request for the configuration information.

19. The device of claim 17, wherein the at least one processor is further configured to:
acquire the configuration information associated with the application program by querying a local application program configuration file stored at the application service device,
wherein the local configuration file stored at the application service device is periodically synchronized with a corresponding configuration file stored at a query server.

20. The device of claim 14, wherein the at least one processor is further configured to:
send invitation information associated with the application program to all client devices that are connected to the application service device.

21. The device of claim 14, wherein the at least one processor is further configured to:
acquire information associated with the client device that supports the application program;
send the client information to a user currently logged into the application program or the application service device;
receive information on a selected client device that is selected by the user currently logged into the application program; and
send the invitation information to the selected client device.

22. The device of claim 21, wherein the at least one processor is further configured to:
send a support query request relating to the application program to all client devices that are connected to the application service device; and
receive, from the client device, client information including identification information corresponding to the client device from which the client information is received, and a support query result.

23. The device of claim 14, wherein the at least one processor is further configured to:
receive information associated with whether the client device accepts an invitation associated with the invitation information to participate in the application program; and
in response to a determination that the client device accepts the invitation to participate in the application program, provide access to the client device provided that the client device satisfies an access condition of the application program.

24. A computer program product, the computer program product being embodied in a non-transitory computer readable storage medium and comprising computer instructions for:

acquiring, at middleware an application service device, application program information associated with an application program executed by the application service device, the application program information comprising configuration information and run status information;

determining, by the middleware of the application service device, whether the application program supports participation by another application service device, the determining of whether the application program supports participation by the other application service device being based at least in part on the application program information, wherein the configuration information comprises information indicating a maximum number of users supported by the application program, and the run status information comprises a number of users currently participating in the application program;

in response to at least determining that the application program supports participation by another application service device, causing the middleware of the application service device to send invitation information associated with the application program to a client device that is connected to the application service device, wherein the client device to which the invitation information is sent is determined based at least in part on a determination of a capability of the client device; and in response to receiving an indication that the client device has accepted an invitation corresponding to the invitation information, causing the middleware of the application service device to send activation information to the client device, the activation information comprising information to be used in connection with configuring the client device to participate in the application program with the application service device.

\* \* \* \* \*